Figure 3:
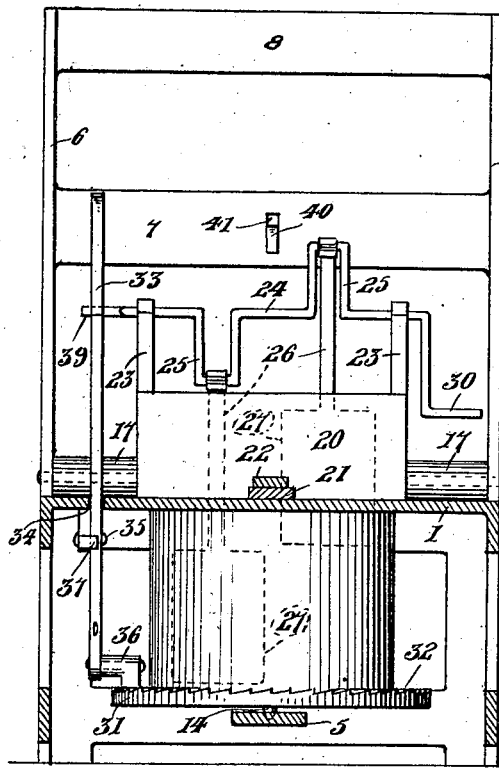

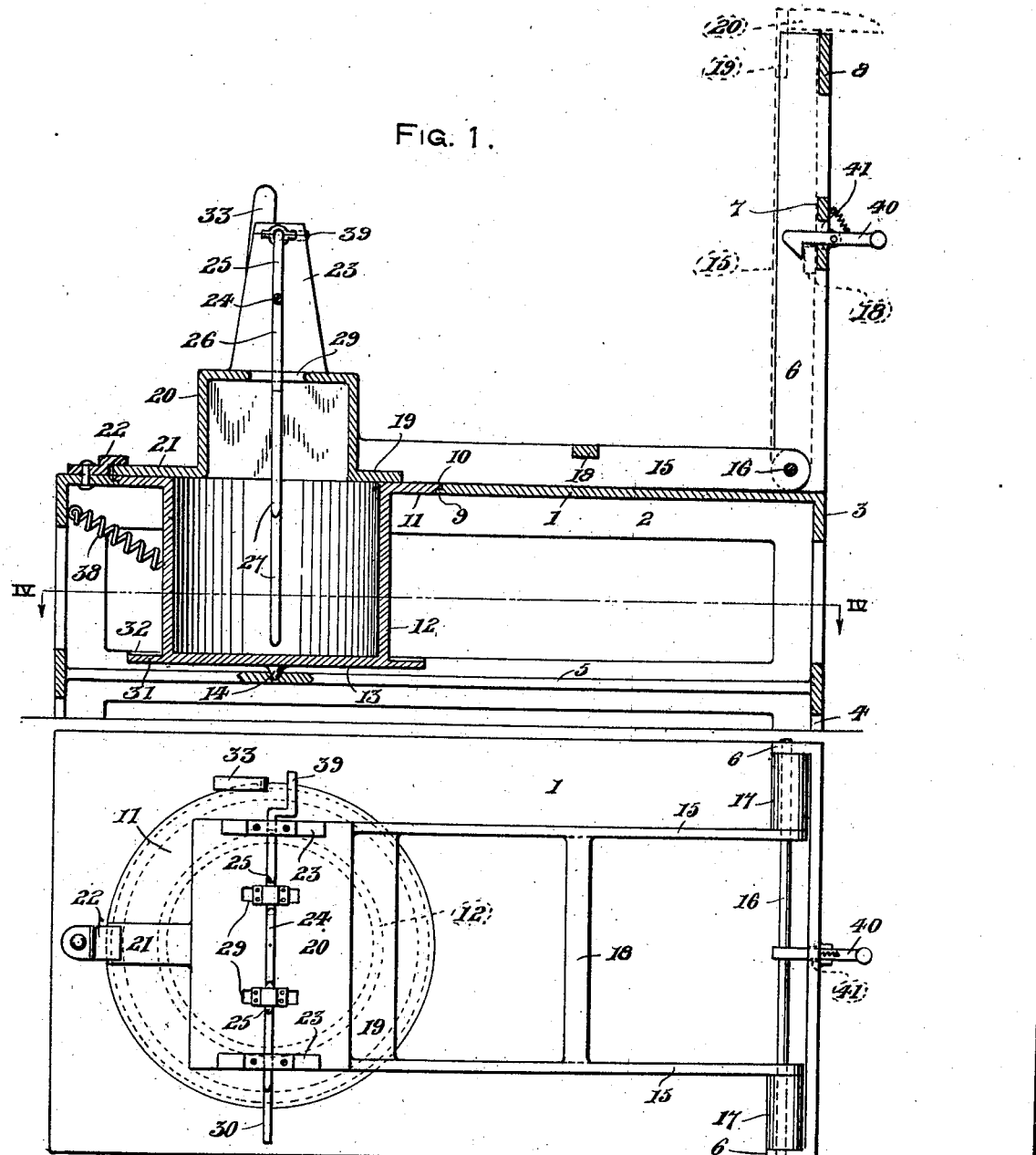

S. WASYLIW.
DOUGH MIXING MACHINE.
APPLICATION FILED AUG. 26, 1920.

1,370,173.

Patented Mar. 1, 1921.
2 SHEETS—SHEET 2.

Inventor
S. Wasyliw.

By A. M. Wilson
Attorney

UNITED STATES PATENT OFFICE.

SEM WASYLIW, OF CUDWORTH, SASKATCHEWAN, CANADA, ASSIGNOR OF ONE-FOURTH TO CHARLES KURTENBACH AND ONE-FOURTH TO FERDENAND KURTENBACH, BOTH OF CUDWORTH, CANADA.

DOUGH-MIXING MACHINE.

1,370,173. Specification of Letters Patent. Patented Mar. 1, 1921.

Application filed August 26, 1920. Serial No. 406,203.

*To all whom it may concern:*

Be it known that I, SEM WASYLIW, a citizen of the Dominion of Canada, residing at Cudworth, in the Province of Saskatchewan and Dominion of Canada, have invented certain new and useful Improvements in Dough-Mixing Machines, of which the following is a specification.

This invention relates to certain new and useful improvements in dough mixing machines and has for its primary object to provide a mixing machine for dough and similar materials wherein the receptacle containing the materials is rotated in a step by step movement during the vertical reciprocation of the beating blades.

A further object of the invention resides in the provision of a dough mixing machine embodying a receptacle portion adapted for step by step rotary movement upon a supporting base with a cover for the receptacle hingedly mounted above the base and carrying beating blades so that the blades and cover are unitarily removable from the receptacle when it is desired to remove the contents after the mixing operation.

With the above and other objects in view, the present invention consists in the novel form, combination and arrangement of parts hereinafter more fully described in connection with the accompanying drawings and in which like reference characters indicate similar parts throughout the several views.

In the drawings,

Figure 1 is a vertical longitudinal sectional view of a dough mixer constructed in accordance with the present invention with the cover and supporting arm therefor of the mixing receptacle shown in removed dotted line position, Fig. 2 is a top plan view of the same.

Figure 5:
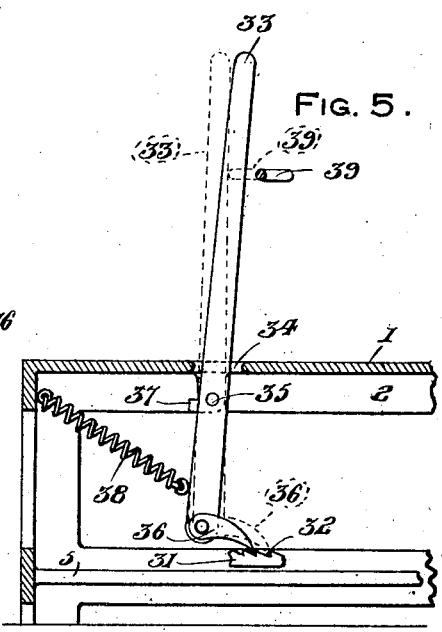
Figure 4:
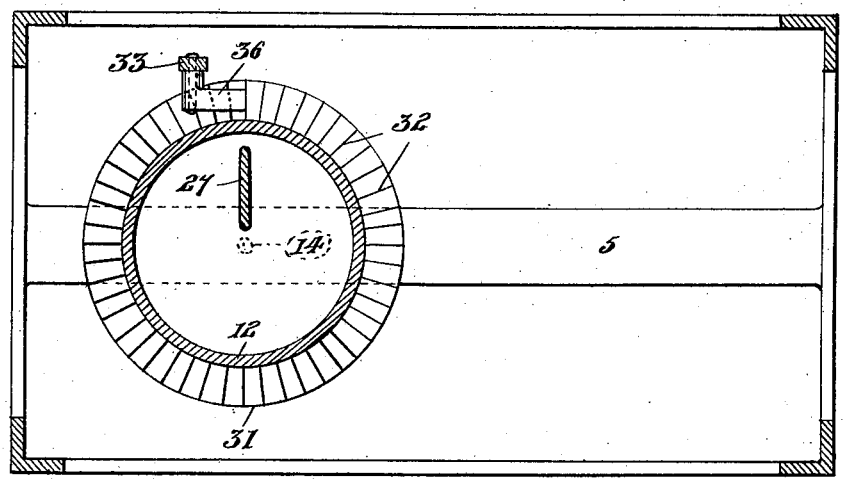

Fig. 3 is a vertical cross sectional view taken through the machine frame showing the mixer receptacle in elevation with the crank shaft for reciprocating the beating blades, Fig. 4 is a horizontal sectional view taken on line IV—IV of Fig. 1 showing the circular rack and dog for effecting step by step rotary movement of the mixing receptacle, and Fig. 5 is a detail sectional view showing the tensioned lever carrying the dog for rotating the mixing receptacle.

Briefly described, the present invention aims to provide a machine for mixing dough or other materials embodying a supporting framework upon which is rotatably mounted a mixing receptacle. A hinged superframe is mounted on the supporting frame and carries a cover for the dough receptacle. The manually operated beating blades are supported on a cam shaft journaled upon the cover and are bodily movable therewith when the cover is shifted to an open position and so retained perpendicularly relative to the supporting base frame. A circular series of ratchet teeth are provided on an annular flange at the base of the mixing receptacle and is adapted to be engaged by a pivoted dog mounted on a tensioned lever that is operated by the crank shaft.

Referring more in detail to the accompanying drawings, there is illustrated a supporting base frame having a flat top wall 1, skeleton side and end walls 2 and 3. respectively with supporting feet 4 at the corners thereof while a central longitudinal brace strip 5 extends between the end walls 3 as clearly shown in Figs. 1, 3, and 4. An end frame projects perpendicularly from the supporting base frame and includes side bars 6 having transverse connecting bars 7 and 8, for purposes presently to appear.

As shown in Figs. 1 and 2, a circular shouldered opening 9 is formed in the top wall 1 of the base frame and supports the shouldered edge 10 of the annular flange 11 carried by the dough receptacle 12, the dough receptacle extending downwardly through the wall opening 9 and being provided upon the bottom wall 13 thereof with an axially positioned bearing 14 received in a depression in the longitudinal brace strip 5, as clearly shown in Figs. 1 and 3. The engaging edges 9 and 10 of the wall opening and the receptacle flange being concentric with the bearing plug 14, rotary movement of the receptacle 12 is thereby permitted.

A swinging cover and beater supporting frame are mounted upon the supporting base frame through the medium of spaced bars 15 shown more clearly in Figs. 1 and 2 as being pivoted at their free ends upon the rod 16 connected at its ends in the side bars 6 of the perpendicular end frame, spacing blocks 17 being positioned between the spaced bars 15 and the side bars 6 to hold the swinging cover frame centrally positioned. A transverse brace 18 extends between the spaced bars 15 intermediate the ends thereof while a cover 19 is carried by the other ends of the arms 15 and overlies the open upper end of the receptacle 12. The cover 19 has a raised or centrally elevated portion 20 and a tongue extension 21 carried by the free swinging edge thereof adapted to be engagel by the hinged cleat 22 to retain the cover in a lowered closed position relative to the receptacle 12. A pair of perpendicular side brackets 23 are carried by the opposite ends of the raised portion 20 of the cover and has journaled therein a crank shaft 24 having double crank arms 25 extending in opposite directions and having connected thereto rods 26 carrying beating blades 27 at the lower end thereof which extend within the receptacle 12 while the connecting rods 26 freely project through slotted openings 29 in the cover part 20. The crank shaft 24 is rotated by the handle 30, thus vertically reciprocating the beating blades 27 in an obvious manner.

Simultaneously with the perpendicular movement of the beating blades, the receptacle 12 is rotated with a step by step movement, accomplished through the medium of the annular flange 31 carried by the lower end of the receptacle 12 and having ratchet teeth 32 formed upon the upper face thereof. A vertically disposed lever 33 projects through an opening 34 in the top wall 1 of the supporting base frame and is pivotally mounted as at 35 as shown in Figs. 3 and 5 and carries at its lower end a gravity drop dog 36 engaging the ratchet teeth 32 of the receptacle flange 31 as illustrated. A block 37 limits the rearward movement of the lower end of the lever 33 as influenced by the spring 38 connected to the lower end of the lever and to the adjacent end wall 3 of the base frame. As shown more clearly in Figs. 2, 3, and 5, the end of the crank shaft 24 opposite the handle 30 is provided with an offset portion 39 adapted when the crank shaft is rotated to engage the upper end of the lever 33 and move the same to the dotted line position shown in Fig. 5 with the dog 36 engaging the toothed flange 31 to rotatably shift the receptacle 12.

When it is desired to remove the contents from the receptacle 12, the cleat 22 is moved upon its pivotal mount to free the tongue extension 21 of the cover at which time the side bars 15 are swung upwardly upon the pivot rod 16 carrying therewith the cover, beating blades and operating mechanism therefor and positioning the cross bar 18 of the bars 15 in proximity of the cross bar 7 of the perpendicular base supporting end frame. A tensioned latch 40 is pivotally mounted upon the cross bar 7 and projects through an opening 41 provided therein for engagement with the cross bar 18, thereby to hold the swinging frame and cover with the mechanism carried thereby in an elevated position.

When it is desired to mix dough or other material in the receptacle 12, the cover 19 is lowered onto the receptacle and clamped by the cleat 22. The operation of the crank shaft 24 by the handle 30 vertically reciprocates the beating blades 27 therein to agitate the contents. Simultaneously with the reciprocating movement of the beating blades, the offset end 39 of the crank shaft engages the lever 33 to move the same upon its pivot 35 against the tension of the spring 38 to cause the dog 36 to lock with the ratchet teeth 30 in effecting rotation of the receptacle. When the offset end of the crank shaft is displaced from the lever 33, the spring 38 retracts the lower end of the lever and the dog carried thereby for ratcheting over the teeth for a new engagement therewith, thus providing for a rotary step by step movement of the receptacle so that a double beating action of the contents within the receptacle is accomplished.

While there is herein shown and described what is believed to be the preferred embodiment of the invention, it is nevertheless to be understood that minor changes may be made therein without departing from the spirit and scope of the invention as hereinafter claimed.

What is claimed as new is:

1. A dough mixing machine of the type described comprising a supporting base frame, a receptacle rotatably supported therein, a cover for the receptacle hinged to the base frame, beating blades carried by the hinged cover extending into the receptacle, means supported on the cover for reciprocating said blades and coöperating devices carried by the receptacle and base supporting frame adapted to be operated by the beating blade operating means to effect rotation of the receptacle.

2. A dough mixing machine of the type described comprising a supporting base frame, a receptacle rotatably supported therein, a cover for the receptacle hinged to the base frame, beating blades carried by the hinged cover extending into the receptacle, means supported on the cover for reciprocating said blades and coöperating means carried by the receptacle cover and base frame for holding the cover with the beating blades carried thereby in open position.

3. A dough mixing machine comprising a rotatably mounted receptacle, a cover for the receptacle swingingly mounted above the same, an annular flange having ratchet teeth carried by the receptacle, a tensioned lever having a dog in engaegment with the ratchet teeth, beating blades mounted on the cover and extending into the receptacle and means for simultaneously operating the beating blades and lever.

4. A dough mixing machine comprising a rotatably mounted receptacle, a cover for the receptacle swingingly mounted above the same, an annular flange having ratchet teeth carried by the receptacle, a tensioned lever having a dog in engagement with the ratchet teeth, beating blades mounted on the cover and extending into the receptacle, a crank shaft to which the beating blades are connected and an offset carried by one end of the crank shaft adapted to engage said lever to rotate the receptacle with a step by step movement.

5. A dough mixing machine comprising a rotatably mounted receptacle, a cover for the receptacle swingingly mounted above the same, an annular flange having ratchet teeth carried by the receptacle, a tensioned lever having a dog in engagement with the ratchet teeth, beating blades mounted on the cover and extending into the receptacle, a crank shaft to which the beating blades are connected, an offset carried by one end of the crank shaft adapted to engage said lever to rotate the receptacle with a step by step movement and means for limiting the retrograde movement of the lever dog.

In testimony whereof I affix my signature.

SEM WASYLIW.